(12) United States Patent (10) Patent No.: US 7,597,044 B2
Oh (45) Date of Patent: Oct. 6, 2009

(54) DEVICES FOR REFORMING FRYING OIL

(76) Inventor: Sung-Hwan (Sonny) Oh, 3923 Park Blvd., Palo Alto, CA (US) 94306

( * ) Notice: Subject to any disclaimer, the term of this patent is extended or adjusted under 35 U.S.C. 154(b) by 701 days.

(21) Appl. No.: 11/143,373

(22) Filed: Jun. 1, 2005

(65) Prior Publication Data

US 2006/0272513 A1 Dec. 7, 2006

(51) Int. Cl.
*A47J 27/00* (2006.01)
*C10G 35/04* (2006.01)
(52) U.S. Cl. .............. 99/330; 99/403; 208/134; 208/135
(58) Field of Classification Search .......... 99/330, 99/403; 208/134, 135
See application file for complete search history.

(56) References Cited

U.S. PATENT DOCUMENTS 4,852,471 A * 8/1989 Lansing .............. 99/330
5,433,841 A 7/1995 Ichikawa

FOREIGN PATENT DOCUMENTS

| JP | 4-109919 | * | 4/1992 |
| JP | 2000-51087 | * | 2/2000 |
| JP | 2000-139726 | * | 5/2000 |

OTHER PUBLICATIONS

Winston Industries, "*PF46C-VLP/T & PF56C-VLP/T Very Low Pressure/Temperature Fryer, 8 Channel programmable control*", pp. 1-2, Jan. 27, 2004.

www.oilfresh.com, *OilFresh 14 Weeks Test Report*, "*Better Taste, Crispier & Healthier Fries*", p. 1 Dec. 24, 2004.

San Jose Mercury News, "*OilFresh Company Introduces Anti-Oxidation Device for Restaurant Industry, Frying Oil Stays Fresh Longer Through Nanotechnology*", Sunnyvale, California, pp. 1-2, Mar. 15, 2005.

San Jose Mercury News, "Ideas & Innovations: nanotechnology, *Science of the Small Produces 'Huge' Savings*", p. 1, Mar. 28, 2005.

www.Oilfresh.com, "*Quicker, Crispier, Healthier Fries . . . Plus Substantial Cost Savings!*",. p. 1-2, Apr. 2005.

www.winstonind.com/cf.htm, "*Winston Industries, Collectramatic Fryer and Accessories*", pp. 1-2, May 25, 2005.

* cited by examiner

*Primary Examiner*—Shawntina Fuqua
(74) *Attorney, Agent, or Firm*—Patent Office of Dr. Chung Sik Park

(57) ABSTRACT

Devices for reforming frying oil in a cooking vessel for the purpose of prolonging the freshness and usable life of the frying oil. The devices include beads that come into contact with the frying oil and reform the frying oil at ordinary temperatures, where each bead has a coating that is formed on the surface of a substrate and acts as a reforming catalyst. One of the devices includes a mounting adapter having flanges to mount on a pair of heating pipes or heating surfaces of a cooking vessel, a bead container for containing the beads; and hook brackets connected to the bead container and configured to couple to the mounting adapter so that the bead container is suspend to the mounting adapter during operation. The bead container has perforations on its walls to make the beads contact with the frying oil.

17 Claims, 15 Drawing Sheets

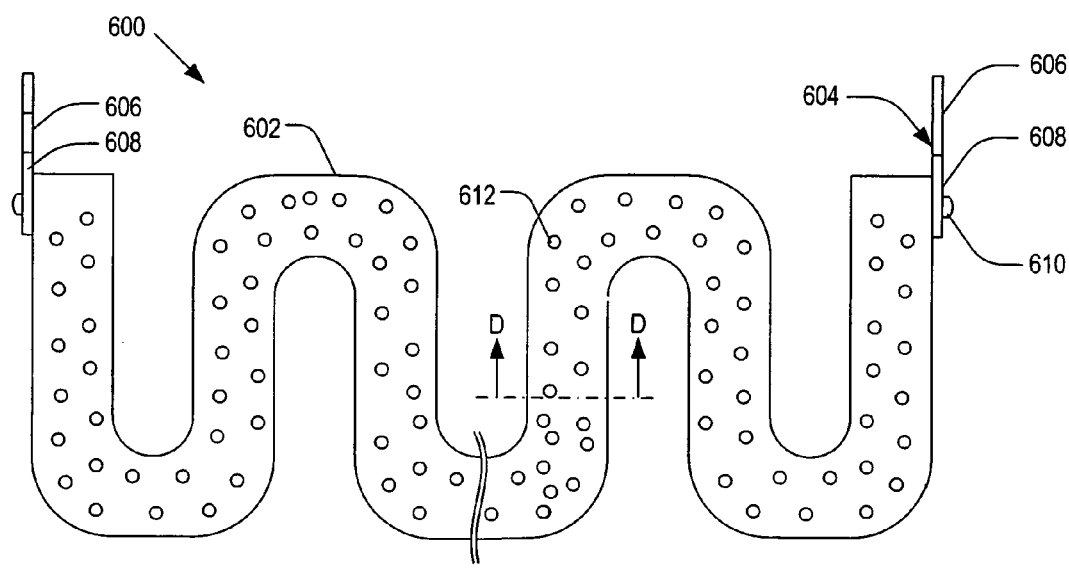
FIG. 6
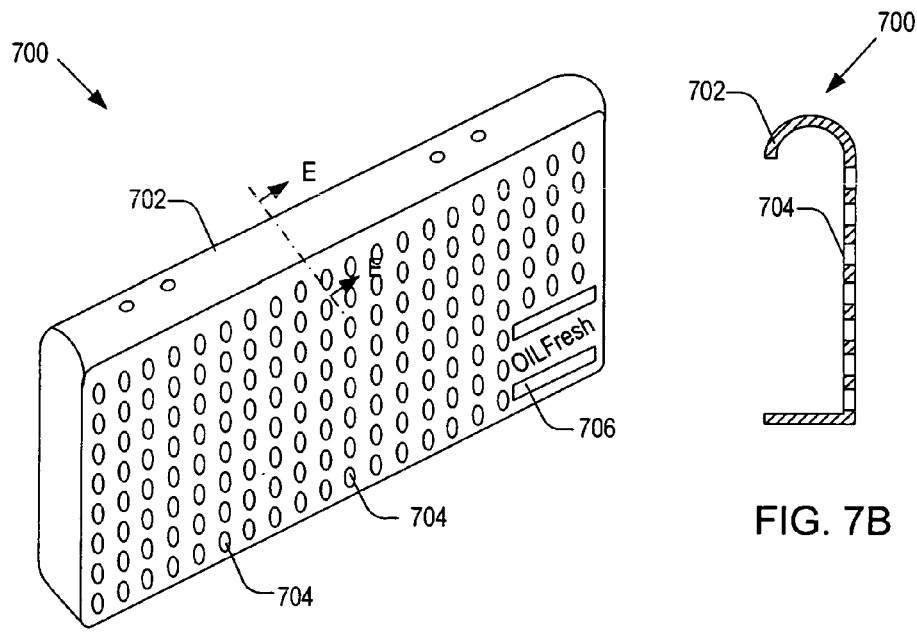
FIG. 7A
FIG. 7B

DEVICES FOR REFORMING FRYING OIL

BACKGROUND OF THE INVENTION

The present invention generally relates to hydrocarbon reforming and, more particularly, to devices for reforming frying oil.

In many cooking environments, such as restaurants, home kitchens, fried food manufacturers, and the like, frying food is one of the most prevalent ways to prepare various recipes. Typically, a cooking vessel gets a refill of fresh frying oil, such as shortenings or vegetable oils, upon lapse of a preset operational interval from the refill or detection of oil deterioration exceeding an allowable level due to the repeated use of the oil. Typically, the deteriorated oil has a darker color and/or generates smoke when food is placed into the oil at elevated temperatures for frying (or, equivalently, ordinary temperatures).

One of the deterioration mechanisms of frying oil may be the heating that causes sudden thermal oxidation at the contact surface with air to form peroxides, and polymers (giant oil molecules) are formed via dimers, resulting in increased viscosity. In frying, when food is placed in the oil having increased viscosity, fine bubbles are generated and harmful cyclic compounds are also produced. An increase in viscosity also inhibits heat conduction to the food, resulting an increase of cooking time and fuel consumption to heat the oil. It also causes fried food to be impregnated with the oil, resulting in oiliness. In addition, the food is not crisply fried and the freshness and original flavor of the food is not maintained.

Several efforts have been undertaken to prolong the freshness of frying oil. For example, at http://www.indiamart.com/kavtee-cimpex, Frypowder oil stabilizer®, additives to stabilize the performance of frying oil, has been disclosed. However, Frypowder oil stabilizer® is a consumption type additive and requires timely filtration at regular intervals. Another approach to prolong the freshness can be found at http://noodle-machines.com/frying-oil-filter.html, where a frying oil filter is used to remove impurities and lower the content of oil oxidation in the frying oil. One drawback of the filter is that it filters out unwanted oxidation byproducts, instead of preventing them from forming in the first place. The filter also includes an oil pump for circulating the frying oil to be filtered.

As the process of oxidation polymerization or thermal polymerization of frying oil may have a negative impact on the freshness and usable life of the frying oil, there is a strong need for a device for suppressing the polymerization process without using chemical additives or filters, where the device can be easily maintained and installed in conventional cooking vessels.

SUMMARY OF THE INVENTION

The present invention provides devices for prolonging the freshness and usable life of frying oil. The devices include a plurality of beads that come into contact with the frying oil and reform the frying oil at ordinary temperatures, where each bead has a coating that is formed on the surface of a substrate and acts as a reforming catalyst. Each device may include a mounting adapter and/or hooking mechanisms for easy installation into a conventional cooking vessel.

In one aspect of the present invention, a device for reforming frying oil contained within a cooking vessel includes: at least one bead container having perforations or other small openings formed in at least one wall thereof and being submerged in the frying oil during operation of the cooking vessel; beads contained within the bead container, the beads being coated with a catalyst for reforming the frying oil flowing through the perforations and in contact therewith; and a suspending mechanism for supporting the bead container relative to the cooking vessel.

In another aspect of the present invention, a device for reforming frying oil contained in a cooking vessel includes: a bead container having perforations or small openings in at least one wall thereof, the bead container having a circular inner aperture, and an outer perimeter that has a generally polygonal shape, wherein each leg of the polygonal shape is slightly bowed toward a center of the bead container; and beads contained within the bead container, the beads being coated with a catalyst for reforming the frying oil flowing through the perforations and in contact therewith.

In still another aspect of the present invention, a cooking vessel includes walls for containing frying oil, means for heating the frying oil, means for supporting food submerged in the frying oil, and oil treatment means, an improved oil treatment means includes: at least one container having perforations formed in at least one wall thereof and being submerged in the frying oil during operation of the cooking vessel; beads contained within the bead container, the beads being coated with a catalyst for reforming the frying oil flowing through the perforations and in contact therewith; and a suspending mechanism for supporting the bead container relative to the cooking vessel.

These and other features, aspects and advantages of the present invention will become better understood with reference to the following drawings, description and claims.

BRIEF DESCRIPTION OF THE DRAWINGS

FIG. 6 is a front elevation of a bead trap in accordance with further another embodiment of the present invention;

FIG. 7A is a perspective view of an alternative embodiment of the front shell of the bead trap assembly depicted in FIG. 3;

FIG. 7B is a cross sectional view of the front shell in FIG. 7A, taken along the line E-E;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides devices for prolonging the freshness and usable life of frying oil in a cooking vessel. Unlike existing approaches that use chemical additives or filters, the devices of the present invention have a plurality of beads that come into contact with the frying oil and reform the frying oil at ordinary temperatures. Each bead preferably has a coating that is formed on the surface of a substrate and acts as a reforming catalyst. The device may be suspended in the cooking vessel using a mounting adapter that may be placed over a pair of heating pipes or heating surfaces of the cooking vessel. Alternatively, the device may have a hooking mechanism for gripping a grill in the cooking vessel or a wall of the cooking vessel.

By placing the devices into frying oil, the freshness and usable life of the frying oil can be significantly prolonged. Also, as the heat conduction of the frying oil may degrade at a slower rate, the cooking time may be reduced, which turns into savings in fuel and the frying oil. The devices may yield better taste, crispier deep-fried foods, better consistency of product, and substantial benefits to health and the environment.

Figure 1:
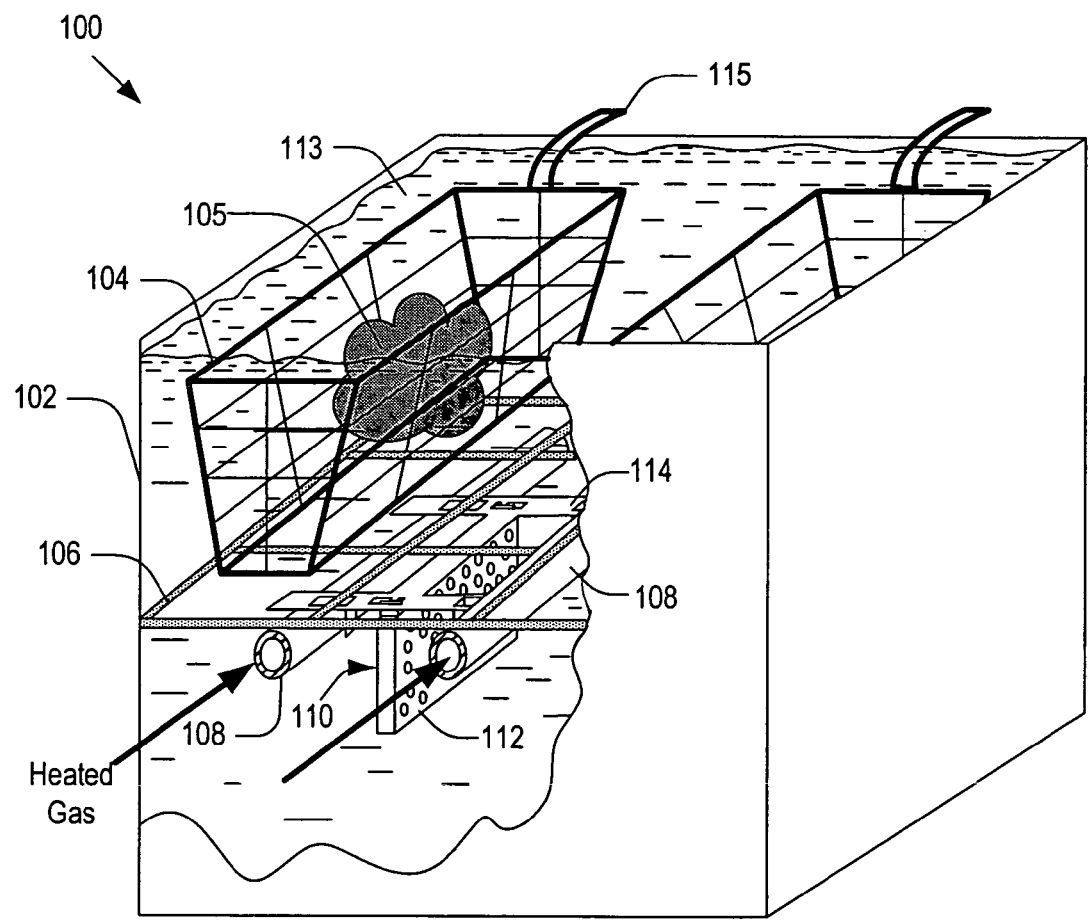
FIG. 1 is a partial cut-away view of a cooking vessel having mounted therein a beat trap assembly for reforming frying oil in accordance with one embodiment of the present invention.

FIG. 1 is a partial cut-away view of a cooking vessel shown at 100 and having mounted therein a beat trap assembly for reforming frying oil in accordance with one embodiment of the present invention. The cooking vessel 100 may include: side walls 102 for containing frying oil 113; a plurality of heating pipes 108 for heating the frying oil 113; a grill 106 mounted on the plurality of heating pipes 108; at least one basket 104 having a handle 115 and mounted on the grill 106; and a bead trap assembly 110 having a mounting adapter 114 and a bead trap 112. The basket 104 may be a strainer and retainer for food 105 while the frying oil 113 passes through. Hereinafter, the terms basket and strainer may be used interchangeably. As illustrated in FIG. 1, the mounting adapter 114 may be installed between the grill 106 and the plurality of heating pipes 108. Heated gas, which can be generated by a conventional burner, may pass through and conduct heat to the heating pipes 108 from the conventional burner that is not shown in FIG. 1 for simplicity.

In FIG. 1, only two baskets 104 and two heating pipes 108 are shown. However, it should be apparent to those of ordinary skill that the present invention may be practiced with any suitable number of baskets and heating pipes.

The bead trap 112 may be suspended from the mounting adapter 114 via a hooking mechanism as illustrated in FIG. 1. In an alternative embodiment, the bead trap 112 may be suspended directly from the grill 106 or one of the side walls 102, instead of the mounting adapter 114, using various suspending mechanisms. Further details of the bead trap assembly 110 and suspending mechanisms are described in connection with FIGS. 3-18B.

Figure 2A:
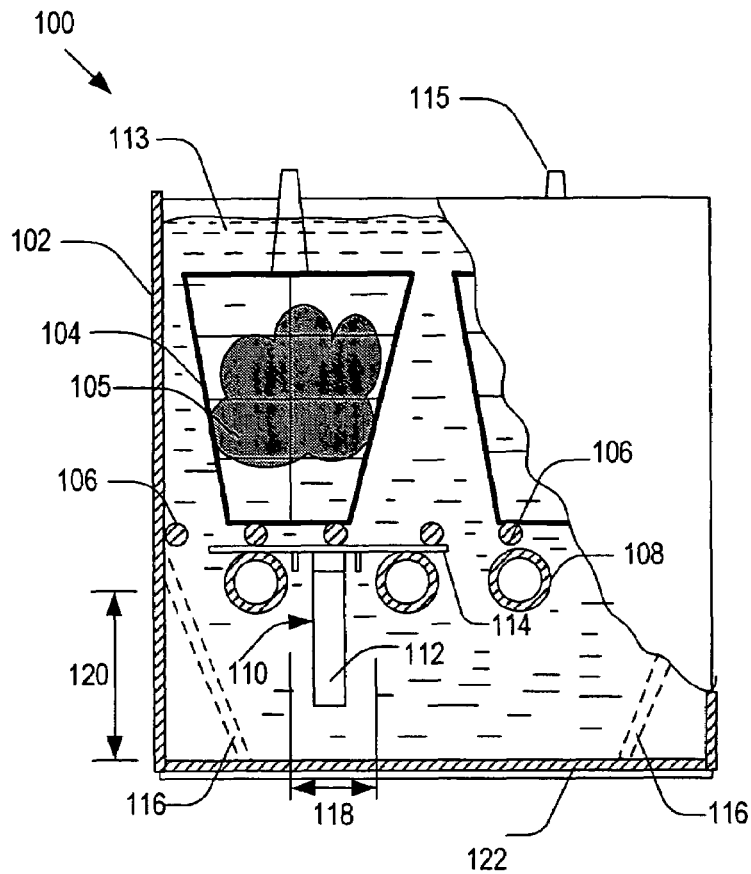
FIG. 2A is a fragmentary front elevation of the cooking vessel in FIG. 1, shown partially in section and partly broken away.

FIG. 2A is a fragmentary front elevation of the cooking vessel shown in FIG. 1, partially in section and partly broken away. As shown, the distance 118 between two neighboring heating pipes 108 may determine the width of the bead trap 112, while the distance 120 between the heating pipes 108 and the bottom wall 122 of the cooking vessel 100 may determine the height of the bead trap 112. Optionally, the cooking vessel 100 may have an additional sidewall 116 to reduce the volume of frying oil 113 within the cooking vessel 100, as shown in FIG. 2A.

Figure 2B:
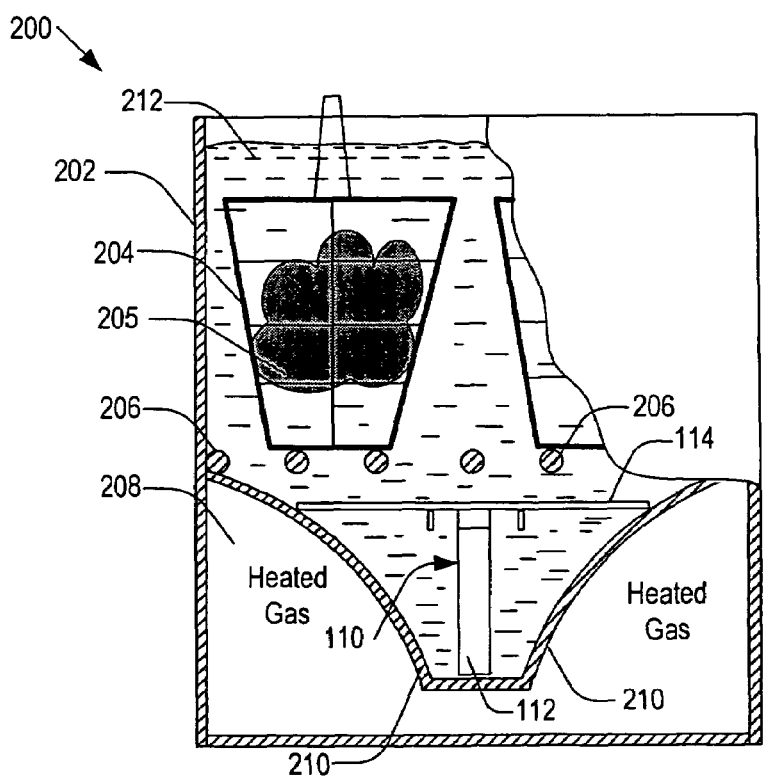
FIG. 2B is a fragmentary front elevation of a cooking vessel having mounted therein a beat trap assembly for reforming frying oil in accordance with another embodiment of the present invention, partially in section and partly broken away.

FIG. 2B is a fragmentary front elevation of an alternative form of a cooking vessel, partially in section and partly broken away. The cooking vessel shown at 200 may include: side walls for containing frying oil 212; at least one basket 204 for retaining food 205; a grill 206 for mounting the basket 204 thereon; a pair of heating surfaces 210 for heating the frying oil 212; and a bead trap assembly 110 in accordance with the present invention and having a mounting adapter 114 and a bead trap 112. Heated gas 208 may be generated by a conventional burner, where the conventional burner is not shown in FIG. 2B for simplicity.

As show in FIG. 2B, the mounting adapter 114 may be located on the pair of heating surfaces 210. As the curvature and size of the heating surfaces 210 can vary according to the manufacturer's specification of each cooking vessel, the width of the mounting adapter 114 and the height of the bead trap 112 may be determined such that the bead trap 112 may not touch the bottom wall 210 when used in most of the commercially available cooking vessels. The dimension of the mounting adapter 114 and the bead trap 112 are determined based on the statistical data obtained by the present inventor and detailed in connection with FIG. 3.

Figure 3:
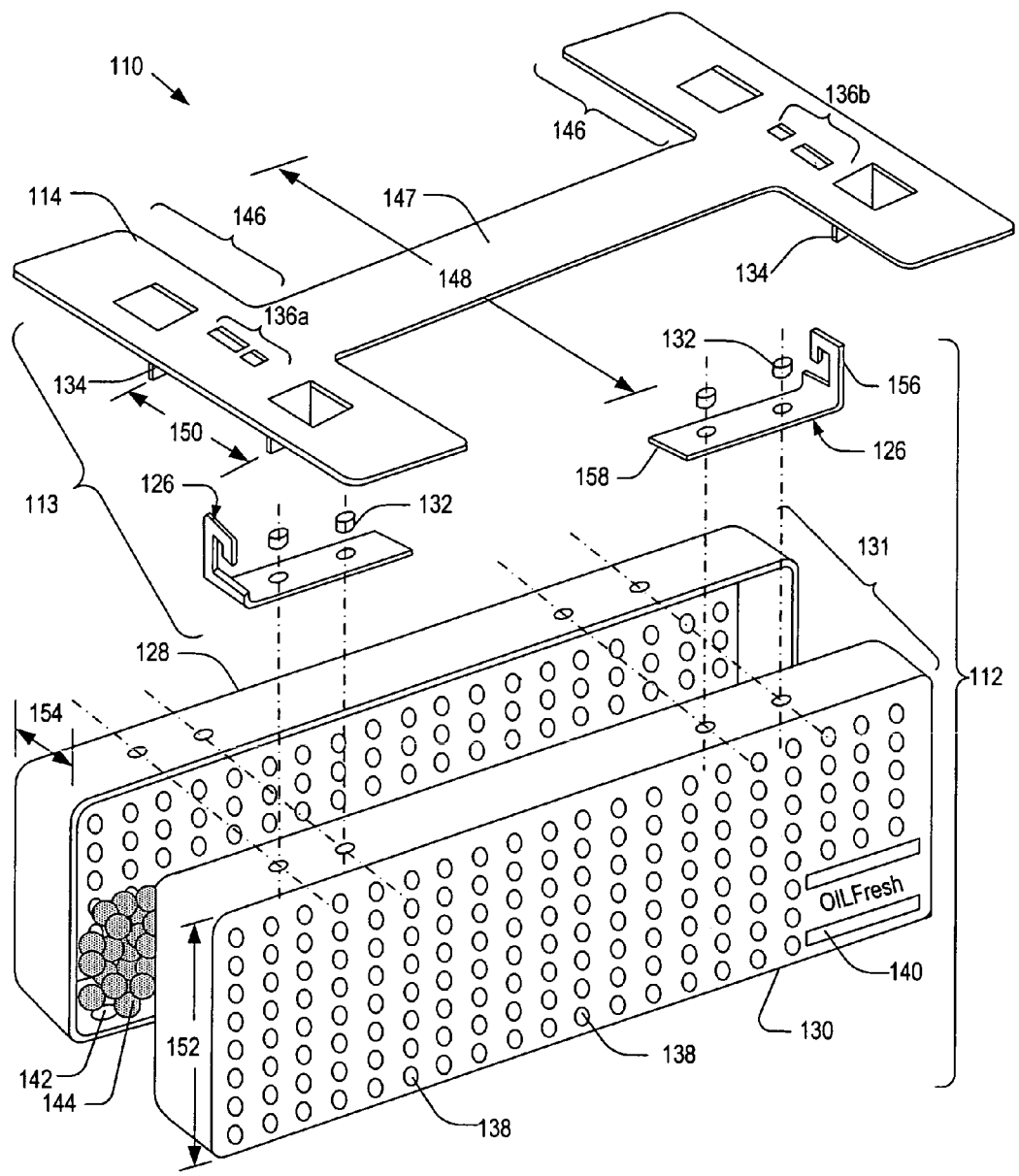
FIG. 3 is an exploded perspective view of the bead trap assembly shown generally in FIG. 1.

FIG. 3 is an exploded perspective view of the bead trap assembly 110 shown generally in FIG. 1. The bead trap assembly 110 may include: the mounting adapter 114 having two pairs of flanges 146 and a web 147; and a bead trap 112, wherein the bead trap 112 has a (bead) container 131 for containing a plurality of beads 144 and a pair of hook brackets 126 attached to the bead container 131 by a conventional fastening mechanism 132, such as rivets or screws. Each of the hook brackets 126 may include a hook portion 156 and a bracket portion 158. The bead container 131 may include a front shell 130 and a rear shell 128, wherein the front and rear shells are formed with at least one wall having a plurality of perforations 138. In the illustrated embodiment of the present invention, upon filling the beads in the rear shell 128, the front shell 130 and rear shell 128 may be fastened by the fastening mechanism 132 to form the container 131. In an alternative embodiment, the rear shell 128 may tightly fit into the front shell 130 and, preferably, be firmly pressed into the front shell 130 to form the container 131. In another alternative embodiment, the container 131 may be formed by folding a piece of sheet metal, instead of assembling the front and rear shells.

The perforations 138 may be round or otherwise shaped holes and provide oil passages through the bead container 131. The bead container 131, which is preferably made of sheet metal, may also have bottom perforations 142 and food drain slots 140 for draining food crumbs trapped inside of the bead container 131. The top portion of the front and rear shells 130, 128 may not have perforation to avoid entry and trapping of food crumbs inside the bead container 131. The size and shape of the perforations 138 are detailed in connection with FIG. 13. The bead container 131 may be a substantially rectangular cylinder with rounded corners that obviate an injury to a user of the bead trap 112. The mounting adapter 114 may also have rounded corners for the same reason.

As mentioned, the width 154 of the bead container 131 may be determined by the space 118 between two neighboring heating pipes 108, while the distance 120 between the heating pipes 108 and the bottom wall 122 of the cooking vessel 100 may determine the height 152 of the bead container 131. In one embodiment, the width 154 and height 152 are about 0.55 and 4.1 inches, respectively. The width 148 of the mounting adapter 114 (or, equivalently, the span of flanges 146) may be determined by the distance 118 between two neighboring heating pipes 108 as well as the curvature and size of the heating surfaces 210. In the illustrated embodiment of the present invention, the width 148 of the mounting adapter 114 is about 7 inches, which is a statistically optimum value for conventional cooking vessels. In this embodiment, the length of the mounting adapter 114 is about 11.5 inches.

The bead 144 may be obtained by coating a substrate with a coating agent, followed by heat curing. The substrate may be preferably formed of inexpensive materials having a large surface area and durability, such as fine granular aluminosilicate minerals and/or silicate minerals, fine granular metal oxides, fine granular metal hydroxides and fibrous metal oxides.

Examples of the aluminosilicate minerals and the silicate minerals may include zeolite, kaolite, sepiolite, feldspar, vermiculite, high alumina clay and sillimanite. The metal oxides may include silica gel, alumina, zircon, magnesite, iron oxide and manganese oxide. The metal hydroxides may include aluminum hydroxide and iron hydroxide. The fibrous metal oxides may include silica fiber, alumina fiber and silica-alumina fiber. They may be baked at temperatures of about 800° to about 1,800° C. and formed to granular or tabular form. The porous shaped products thus obtained may be used as the substrates. It is preferred that the metallic substrates have no eluting property. The metallic substrates, formed metals and/or metals at least surfaces of which are treated to a porous form or roughened may be preferably employed. Aluminum, iron, stainless steel copper and other alloys may be treated as described above. Examples of the foamed metals include foamed aluminum.

In order to obtain the porous surface, for example, aluminum, iron or stainless steel may be treated to a porous form during its production stage, or a fibrous metal is adhered to the surface by melting. Further, the roughened surface can be obtained by blast treatment or acid-alkali etching treatment.

The shape of the substrates may be any, granular or tabular. In the case of the granular substrates, the average particle size may be 1 to 50 mm, and preferably 3 to 30 mm. A particle size of less than 1 mm may result in easy destruction, while a particle size of more than 50 mm may result in a relatively small specific surface area. Hereinafter, the term specific surface area refers to the surface area per unit volume of the bead. In the case of tabular substrates, the length of one side may be preferably 2 to 300 mm.

The coating layer deposited on the substrate may contain silver and function as reforming catalysts by inhibiting formation of frying oil polymers. The detailed description of the coating layer and the chemical reactions induced by the coating layer to reform frying oil can be found in U.S. Pat. No. 5,433,841 to Ichikawa, which is hereby incorporated by reference in its entirety.

The mounting adapter 114 may be located on top of the heating pipes 108 or heating surfaces 210 and include two pairs of slots 136a-b for mating with the pair of hook brackets 126. In one embodiment, the mounting adapter 114 may be made of sheet metal and has four alignment tabs 134, wherein each of the alignment tabs 134 may be generated by cutting a portion of the mounting adapter in C-shape and bending the portion downward. The alignment tabs 134 may prevent the mounting adapter 114 from sliding off the heating pipes. The distance 150 between the alignment tabs may be determined by the distance between two neighboring heating pipes 108. In one embodiment, the distance 150 may be about 2 inches.

A suspending mechanism 113 may include the mounting adapter 114 and the pair of hook brackets 126 and locate the container 131 in the frying oil 113 (FIG. 1) during the operation of the cooking vessel shown at 100. Other types of suspending mechanisms are detailed in connection with FIGS. 14A-C and 16-18B.

In FIG. 3, the mounting adapter 114 has four flanges 146. However, it should be apparent to those of ordinary skill that the mounting adapter 114 may have more than four flanges.

Figures 4A, 4B:
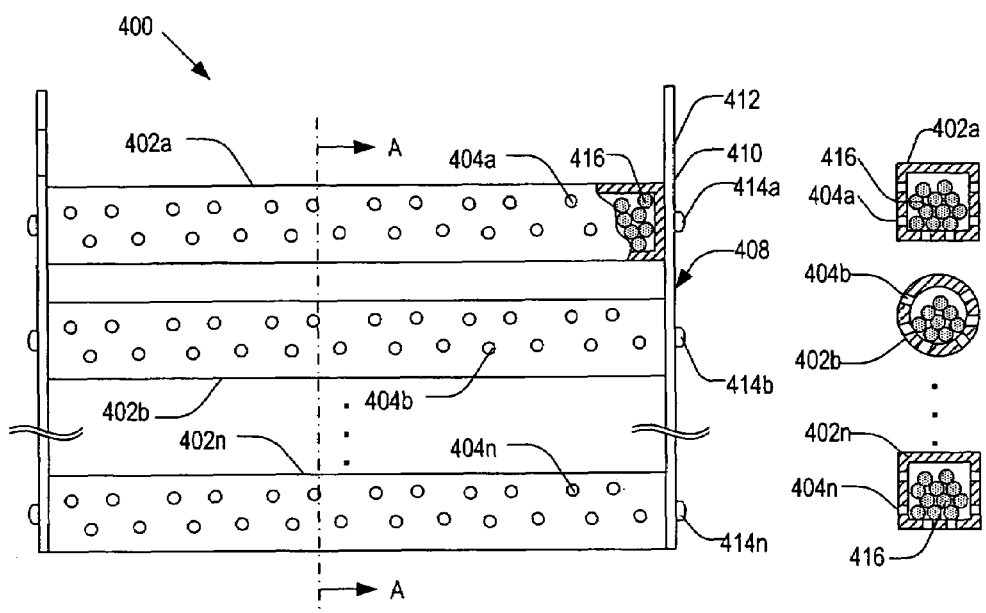
FIG. 4A is a front elevation of a bead trap in accordance with another embodiment of the present invention.
FIG. 4B is a cross sectional view of the bead trap in FIG. 4A, taken along the line A-A.

FIG. 4A is a front elevation of a bead trap 400 in accordance with another embodiment of the present invention. As shown in FIG. 4A, the bead trap 400 may include a pair of hook brackets 408 that may be coupled to the mounting adapter 114 (FIG. 3) and a plurality of bead containers 402a-n. The bead containers 402a-n may have perforations 404a-n, respectively, and closed ends that may be connected to the hook brackets 408 by conventional fastening mechanisms 414a-n, respectively. FIG. 4B is a cross sectional view of the bead trap 400 in FIG. 4A, taken along the direction A-A. As shown in FIG. 4A, the bead containers 402a-n may include beads 416 for reforming the frying oil.

For the purpose of illustration, each of the bead containers 402a-n is shown as either a rectangular or a circular cylinder. However, it should be apparent to those of ordinary skill that the present invention may be practiced with bead containers having any of many geometrical shapes.

Figures 4C, 4D, 4E:
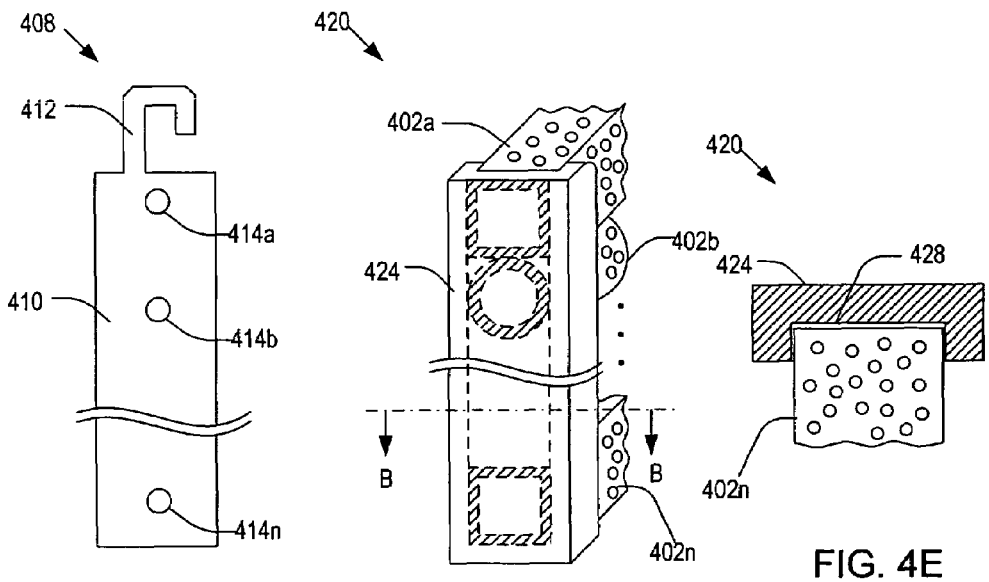
FIG. 4C is a side elevation of a hook bracket that may be used in the bead trap depicted in FIG. 4A.
FIG. 4D is a perspective view of a bead trap in accordance with still another embodiment of the present invention.
FIG. 4E is a cross sectional view of the bead trap in FIG. 4D, taken along the line B-B.

FIG. 4C is a side elevation of one of the hook brackets 408 that may be used in the bead trap 400 in FIG. 4A. As illustrated in FIG. 4C, each of the hook brackets 408 may include a hook portion 412 and an elongated rectangular portion 410 that the bead containers 402a-n are coupled to by the fastening mechanisms 414a-n, respectively.

The hook brackets 408 may be used to suspend the bead trap 400 from the mounting adapter 114 (FIG. 3). However, in some applications where the dimension and/or number of the bead containers 402a-n are large, such as automated food manufacturing factories, the hook brackets 408 may not be suitable for suspending the bead trap 400. In such applications, the bead containers 402a-n may be stacked in a bracket, as illustrated in FIGS. 4D-E, and placed in a suitable location within the oil vessel without using any hook.

FIG. 4D is a perspective view of a bead trap 420 in accordance with another embodiment of the present invention. FIG. 4E is a cross sectional view of the bead trap 420 shown in FIG. 4D, taken along the direction B-B. As illustrated, the bead trap 420 may include a plurality of bead containers 402a-n and a bracket 424 for accommodating the bead containers 402a-n. The bead containers 402a-n may be stacked along the slot 428 of the bracket 424 without using any conventional fastening mechanism so that the containers can be quickly mounted into the slot 428. Also, to accommodate a large volume of frying oil to be reformed, a number of bead container stacks may be In place simultaneously in an alternative embodiment, another slot similar to the slot 428 may be used to hold the other ends of the bead containers 402a-n.

Figure 5A:
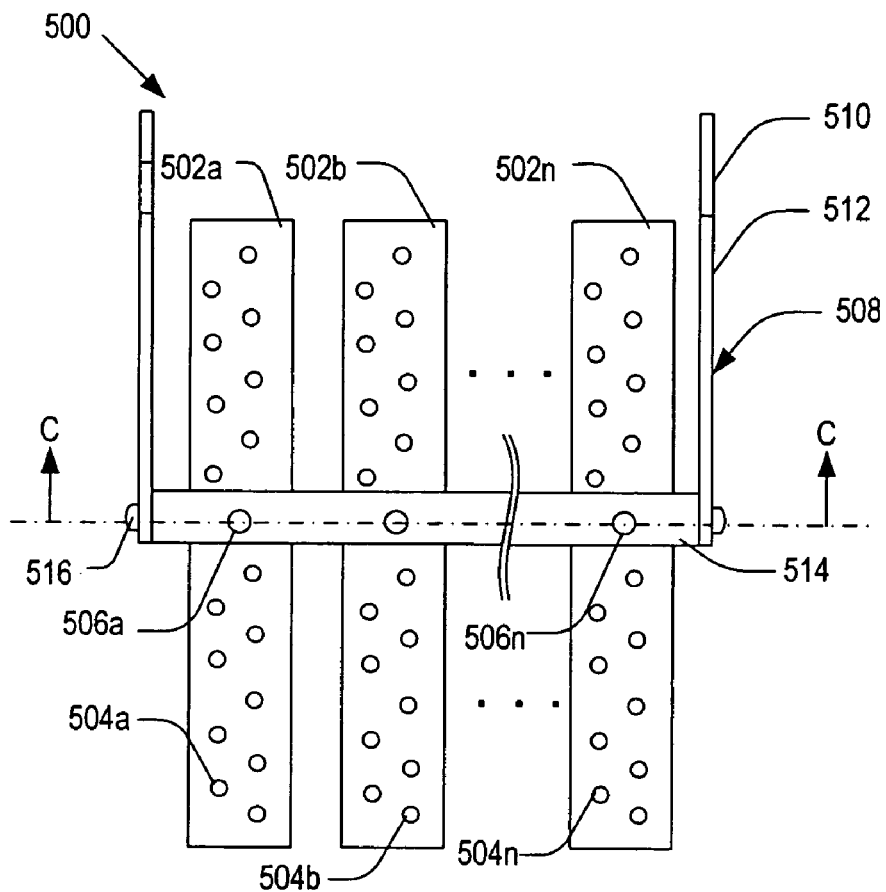
FIG. 5A is a front elevation of a bead trap in accordance with yet another embodiment of the present invention.
Figure 5B:
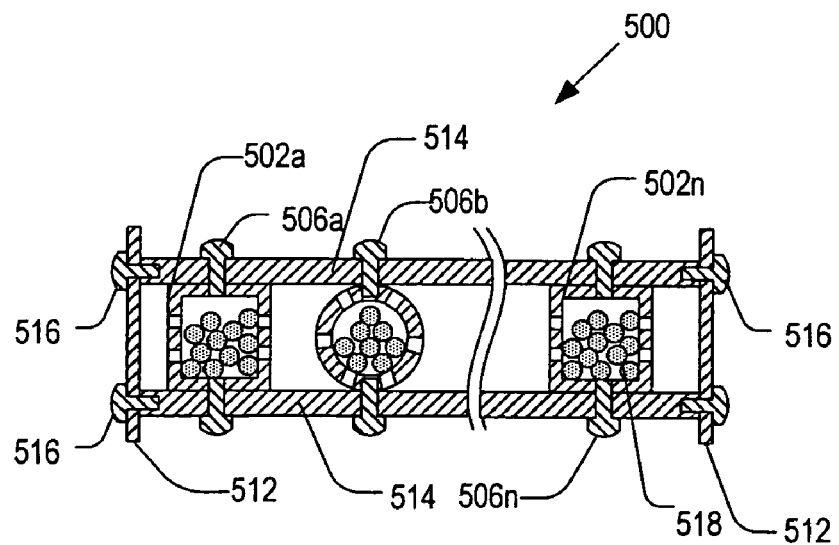
FIG. 5B is a cross sectional view of the bead trap in FIG. 5A, taken along the line C-C.

FIG. 5A is a front elevation of a bead trap 500 in accordance with another embodiment of the present invention. As illustrated, the bead trap 500 may include: a pair of hook brackets 508, each bracket having a hook portion 510 to couple to the mounting adapter 114 (FIG. 3) and an elongated rectangular portion 512; a pair of holding bars 514 connected to the pair of hook brackets 508 (only one of which is shown) via conventional fastening mechanisms 516, such as rivets or screws; and one or more bead containers 502a-n for containing beads 518 (shown in FIG. 5B) and connected to the pair of holding bars 514 via conventional fastening mechanisms 506a-n, respectively. The bead containers 502a-n may include a plurality of perforations 504a-n as oil passages, respectively. FIG. 5B is a cross sectional view of the bead trap 500 depicted in FIG. 5A, taken along the direction C-C. For the purpose of illustration, each of the bead containers 502a-n is shown as either a rectangular or a circular cylinder. However, it should be apparent to those of ordinary skill that the present invention may be practiced with bead containers having any of many geometrical shapes.

FIG. 6 is a front elevation of a bead trap 600 in accordance with still another embodiment of the present invention. As illustrated in FIG. 6, the bead trap 600 may include: a pair of hook brackets 604, each bracket having a hook portion 606 to couple to the mounting adapter 114 (FIG. 3) and an elongated rectangular portion 608; and a bead container 602 having perforations 612. The containers 602 may be connected to the pair of hook brackets 604 via conventional fastening mechanisms 610. In this embodiment, the bead container 602 may be of a tubular shape tortuously folded to lie in a single plane, wherein the cross section of the bead container 602 taken along the direction D-D may be similar to that of the bead containers 502a or 502b. In another embodiment, the bead container 602 may have a helical or other convoluted geometry.

FIG. 7A is a perspective view of an alternative embodiment 700 of the front shell 130 shown in FIG. 3. The front shell 700 may be similar to the front shell 130 with the difference in the shape of the top portion 702. FIG. 7B is a cross sectional view of the front shell 700 in FIG. 7A, taken along the direction E-E. As illustrated, the top portion 702 may have a convex curvature to cause dropping food crumbs to fall away from the front shell 700, when the food crumbs migrate from the basket 104 (FIG. 1).

Figure 8A:
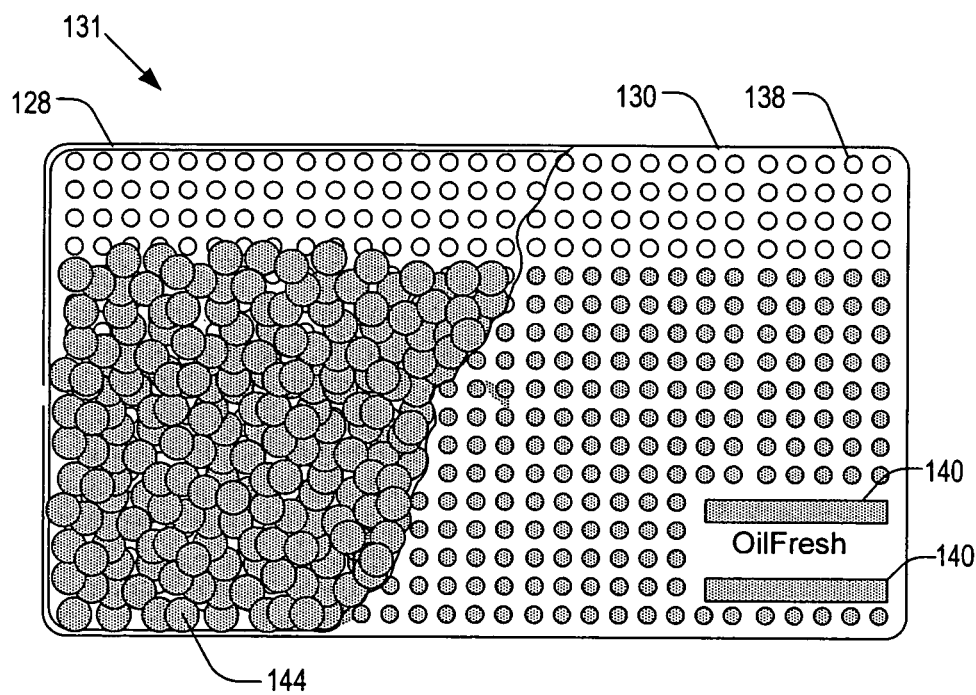
FIG. 8A is a partial cut-away view of the bead container depicted in FIG. 3.
Figure 8B:
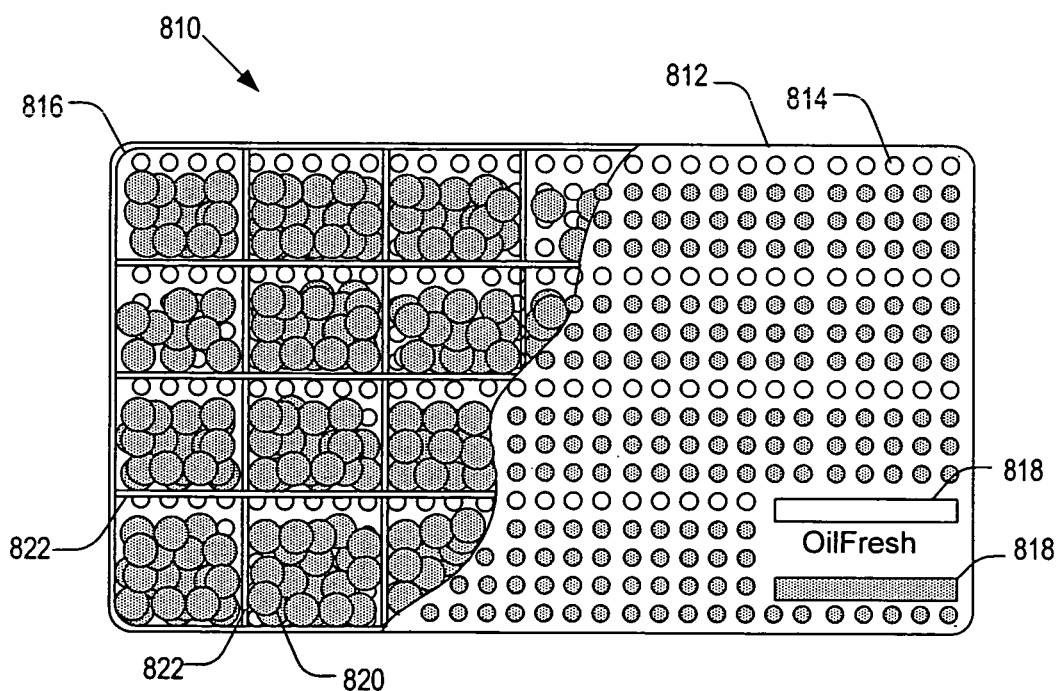
FIG. 8B is a partial cut-away view of an alternative embodiment of the bead container shown in FIG. 3.

FIG. 8A is a partial cut-away view of the bead container 131 in FIG. 3. As illustrated in FIG. 8A, the beads 144 may be stacked on the bottom side of the bead container 131 due to the forces of gravity. As densely stacked beads may have a reduced specific surface area, the efficacy of the bead container 131 may be increased by evenly distributing the beads throughout the bead container 131. For example, FIG. 8B is a partial cut-away view of a bead container 810 in accordance with an alternative configuration of the present invention, wherein the bead container 810 may have partitioning racks or subdividers 822 dividing the container 810 into multiple compartments. As illustrated, the bead container 810 may also include: a rear portion 816; a front portion 812; a plurality of perforations 814 on the rear and front portions 816, 812; food drain slots 818; and a plurality of partitioning racks 822 for evenly distributing beads 820 within the bead container 810. The partitioning racks 822 may also reduce potential damage to the beads 820 during handling the bead container 810 as each of the beads 820 is retained in a smaller compartment confined by neighboring racks 822.

Figure 9A:
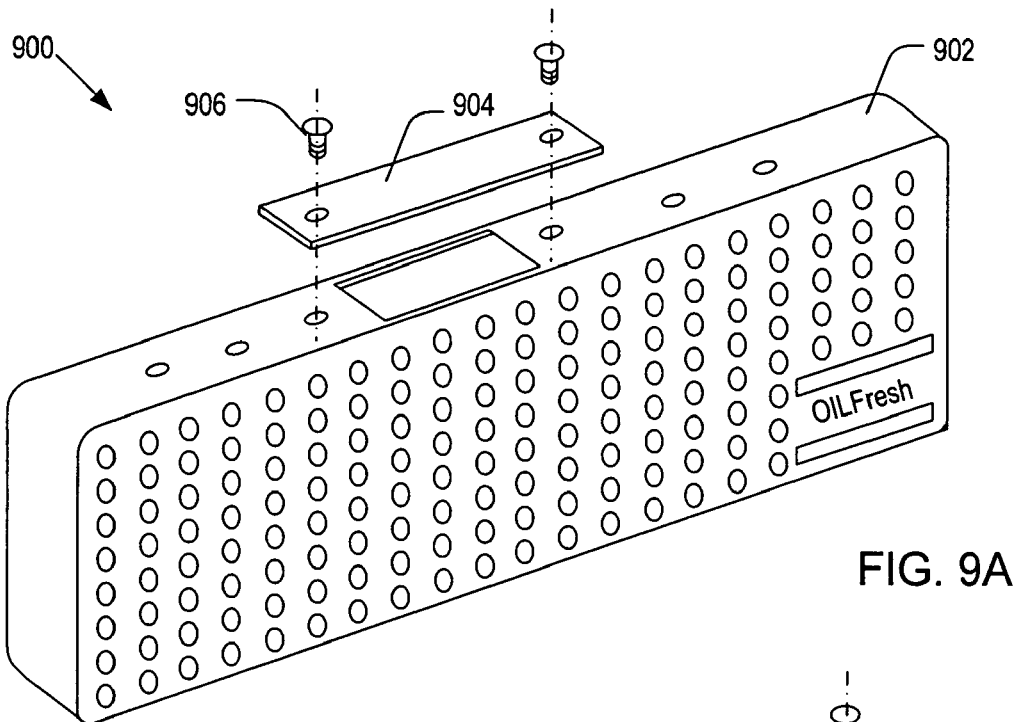
FIG. 9A is an exploded perspective view of another alternative embodiment of the front shell of the bead trap assembly depicted in FIG. 3.

Upon lapse of a predetermined operational interval, the beads 144 (FIG. 8A) in the bead trap assembly 110 may need to be replaced. As explained in connection with FIG. 3, the front and rear portions 130, 128 of the bead container 131 may be fastened permanently by rivets. In that case, the beads 144 in the bead container 131 cannot be replaced, and as a consequence, the entire bead container 131 may be wasted. Thus, to permit reuse of the bead container 131, it is required to have an access window through which the beads 144 can be replaced. FIG. 9A is an exploded perspective view of an alternative embodiment 900 of the front shell 130 in FIG. 3. The front shell 900 may be similar to its counterpart 130 in FIG. 3 with the difference that the top portion 902 has a removable closure or window 904 for accessing the beads, the closure 904 being secured to the top portion 902 by removable fasteners 906.

Figure 9B:
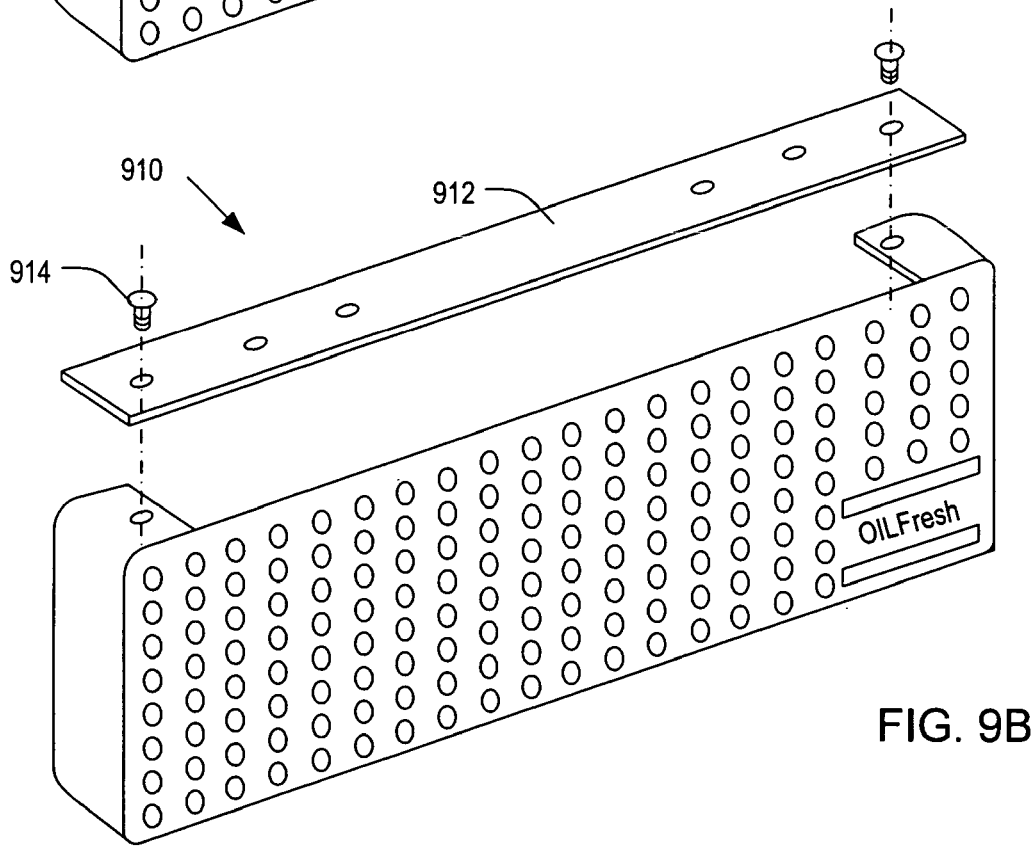
FIG. 9B is an exploded perspective view of still another alternative embodiment of the front shell of the bead trap assembly depicted in FIG. 3.

FIG. 9B is an exploded perspective view of another embodiment 910 of the front shell 130 in FIG. 3 and may be similar to the front shell 900 with the difference that the closure 912, secured by removable screws 914, may cover substantially the entire top portion of the front shell 910.

Figure 10:
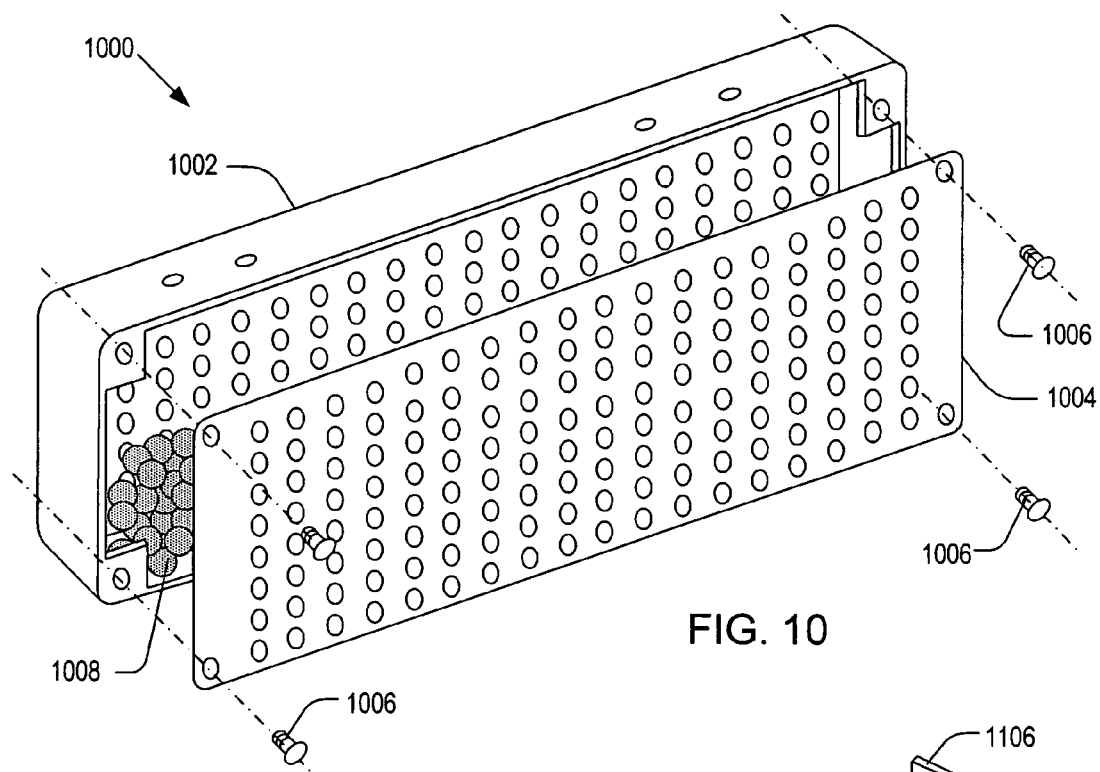
FIG. 10 is an exploded perspective view of another alternative bead container in accordance with the present invention.

FIG. 10 is an exploded perspective view of another form of bead container 1000 in accordance with the present invention. The bead container 1000 may be similar to the bead container 131 with the difference that an apertured rear plate 1004 may be attached to the front shell 1002 by removable screws 1006 and used as a window to access the beads 1008 contained within the bead container 1000.

As mentioned previously, the efficacy of the bead trap assembly 110 (FIG. 3) may increase if the volume of the frying oil 113 contacted by the beads 144 increases. Thus, to increase the efficacy, the walls of the container 131 may be formed of mesh that may have the maximum allowable mesh spacing while keeping the beads 144 within the container 131.

Figure 11:
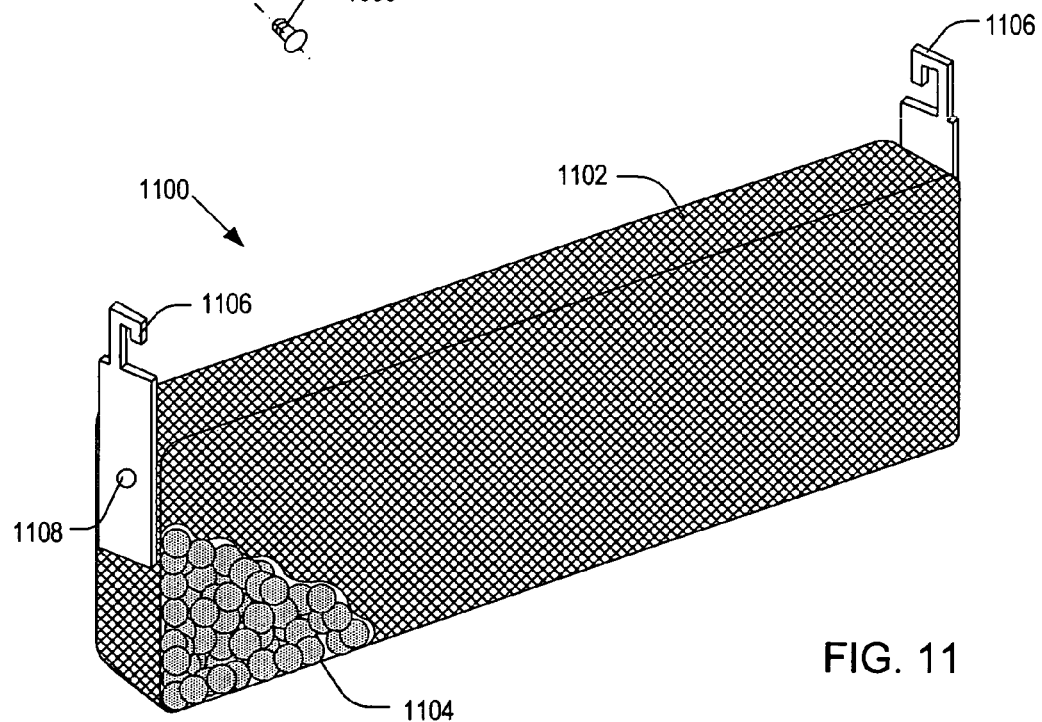
FIG. 11 is a partial cut-away view of a bead trap in accordance with another embodiment of the present invention.

FIG. 11 is a partial cut-away view of still another form of a bead trap 1100 in accordance with the present invention. Unlike the bead trap 112 (FIG. 3) that has perforations 138 formed in the walls of the bead container 131, the bead container 1102 of the bead trap 1100 may be formed of mesh or perforated screen to enhance oil flow therethrough. The bead container 1102 may be attached to a pair of hook brackets 1106 by conventional fastening mechanisms 1108, wherein the hook brackets 1106 may couple to the mounting adapter 114 (FIG. 3).

Figure 12:
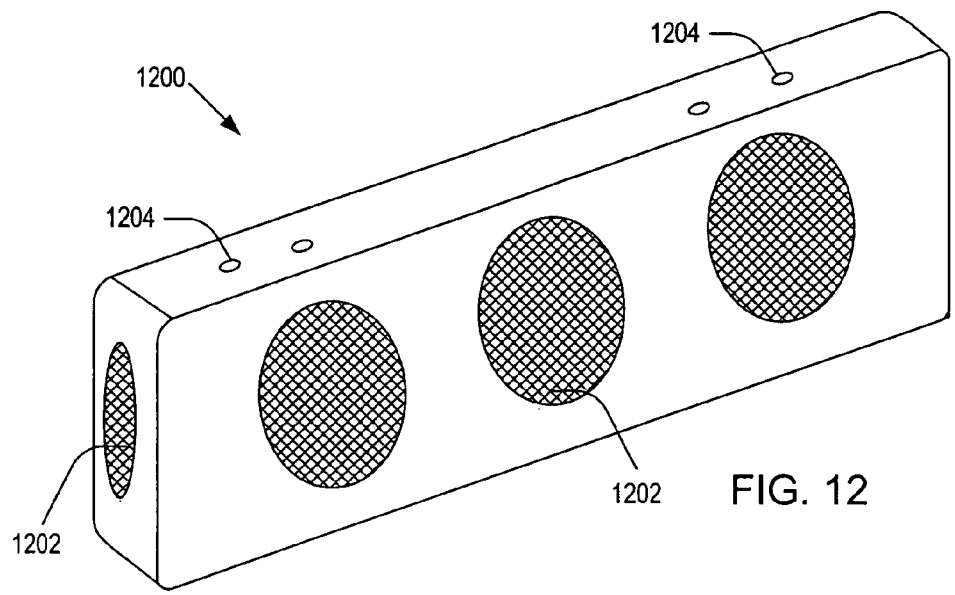
FIG. 12 is a perspective view of a bead container in accordance with another embodiment of the present invention.

In general, the bead container 1102 may be deformable in handling as the mesh may not have enough mechanical strength. To enhance the mechanical strength of the bead container 1102, a portion of the container may be made of sheet metal, as illustrated in FIG. 12 which is a perspective view of a bead container 1200 made in accordance with the present invention, and may include portions made of mesh 1202. The bead container 1200 may be connected to the pair of hook brackets 126 via conventional fasteners (not shown in FIG. 12) through a plurality of holes 1204.

Figure 13:
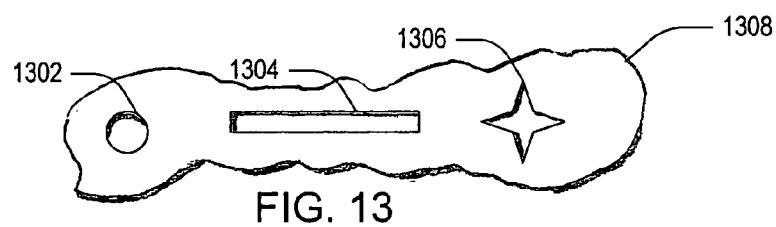
FIG. 13 shows exemplary shapes of perforations used in accordance with the present invention.

As mentioned above, the efficacy of the bead trap assembly 110 (FIG. 3) may increase if the volume of the frying oil 113 contacted by the beads 144 increases. Consequently, to maximize the efficacy, the area of the perforations 138 needs to be maximized while the dimension is small enough to keep the beads 144 within the bead container 131. FIG. 13 shows exemplary shapes 1302, 1304, and 1306 of perforations formed in a wall 1308 that may be used in accordance with the present invention. For the purpose of illustration, only three exemplary shapes are shown in FIG. 13. However, it should be apparent to those of ordinary skill that the present invention can be practiced with many other aperture shapes.

Figures 14A, 14B, 14C:
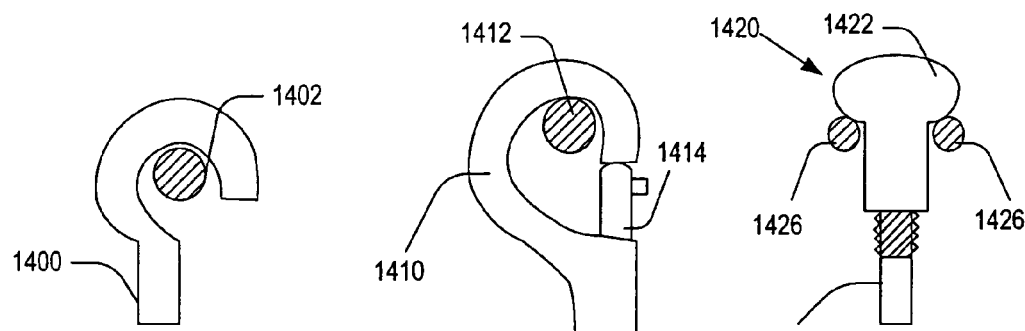
FIGS. 14A-C show various types of hooks used in accordance with the present invention.

As illustrated in FIGS. 2A-B, the bead trap 112 may be suspended from a mounting adapter 114 (FIG. 3) with the adapter placed on top of the heating pipes 108 or heating surfaces 210. In an alternative embodiment, the bead trap 112 may be suspended directly from the grill 106 (or 206) without using the mounting adapter 114. FIGS. 14A-C show exemplary types of hooking mechanisms (or, equivalently, suspending mechanisms) 1400, 1410 and 1420 that can be used to catch or hookingly grip grills 1402, 1412 and 1426, respectively. The hook 1410 in FIG. 14B may be similar to the hook 1400 in FIG. 14A with the difference that a spring snap 1414 is added to secure the hook 1410 during operation. The hooking mechanism 1420 in FIG. 14C may be used when the mesh spacing of the grill 1426 is relatively narrow. As illustrated in FIG. 14C, the hooking mechanism 1420 may include a nut 1422 that may locate on the grill 1426 and a threaded bolt 1424 that may suspend the bead container 131 by coupling to the nut 1422.

Figure 15:
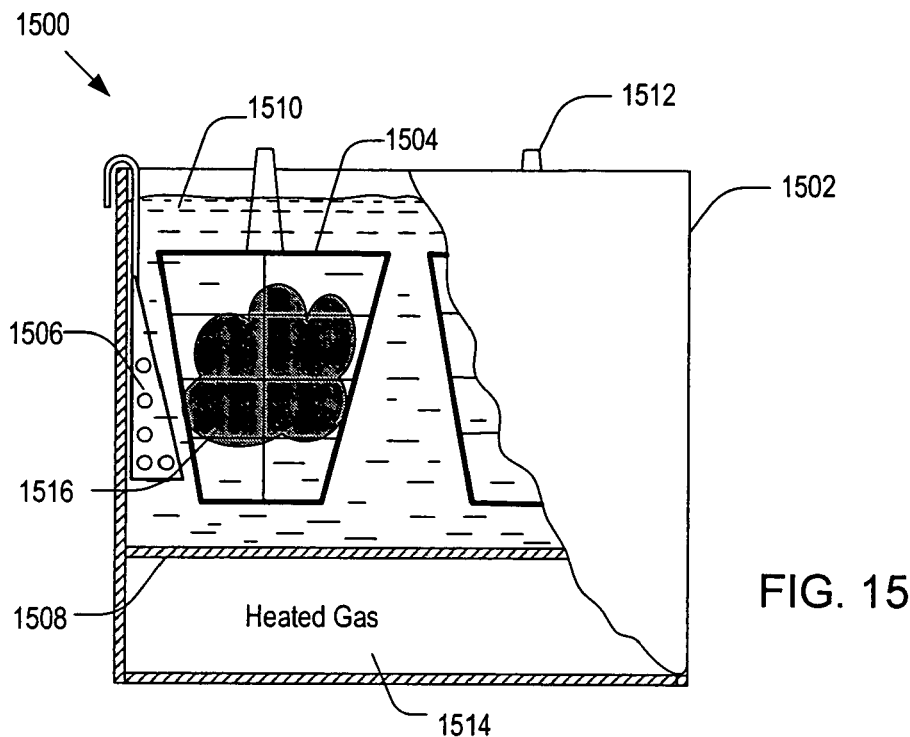
FIG. 15 is a fragmentary front elevation of a conventional cooking vessel including a beat trap for reforming frying oil in accordance with still another embodiment of the present invention, shown partially in section and partly broken away.

In FIGS. 2A-B, the baskets (or, equivalently, strainers) 104 and 204 are shown to locate on top of the grills 106 and 206, respectively. However, some of conventional cooking vessels may not have grills as shown in FIG. 15 which is a fragmentary front elevation of a conventional cooking vessel 1500, partially in section and partly broken away. As illustrated, baskets 1504 containing food 1516 may be suspended to the side wall 1502 of the cooking vessel 1500 by handles 1512 while heating gas 1514 may transfer heat to the heating oil 1510 through the bottom surface 1508. In such cases, a bead trap 1506 may be modified to likewise hang from a sidewall 1502 and fit into the space between the basket 1504 and the side wall 1502.

Figure 16:
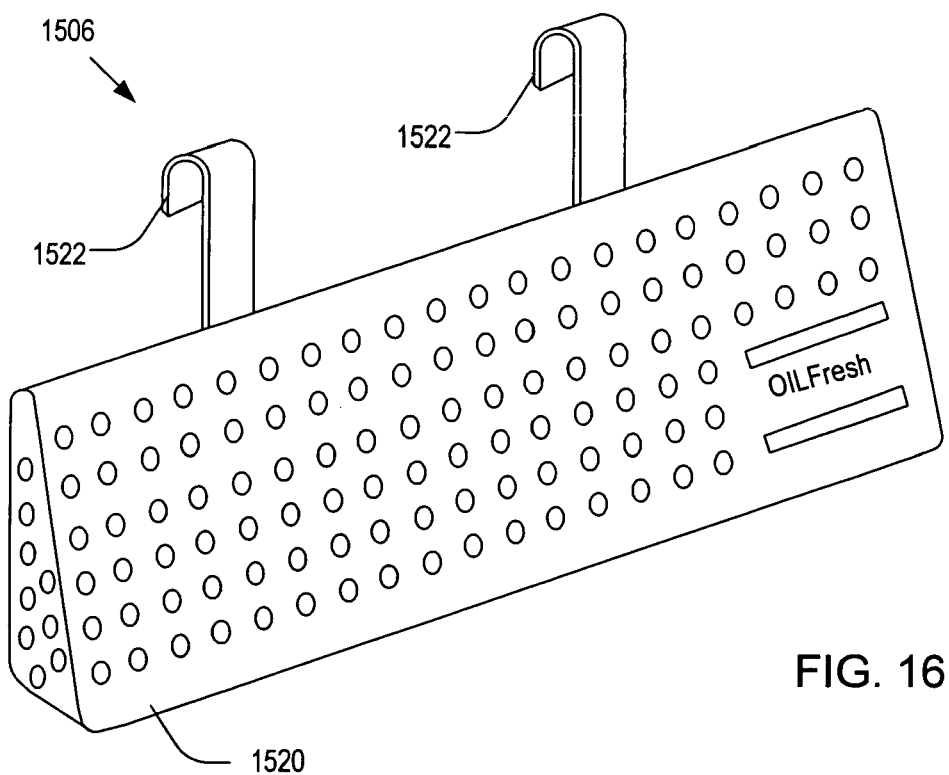
FIG. 16 is a perspective view of the bead trap shown generally in FIG. 15.

FIG. 16 is a perspective view of the bead trap 1506 that may be used in the cooking vessel shown in FIG. 15. As illustrated, the bead trap 1506 may include: one or more hanging brackets (or, equivalently, suspending mechanisms) 1522; and a bead container 1520 attached to the hanging brackets 1522. Each of the hanging brackets 1522 may have an elongated rectangular shape with one end curled to form a hook. The bead trap 1506 may be similar to the bead trap 112 in FIG. 3 with some differences. Firstly, hanging brackets 1522 may be used, instead of the hook brackets 126, to suspend the container 1520 from the side wall 1502. Secondly, the bead container 1520 may be substantially a triangular cylinder to fit into the space between the basket 1504 and the side wall 1502.

Figure 17:
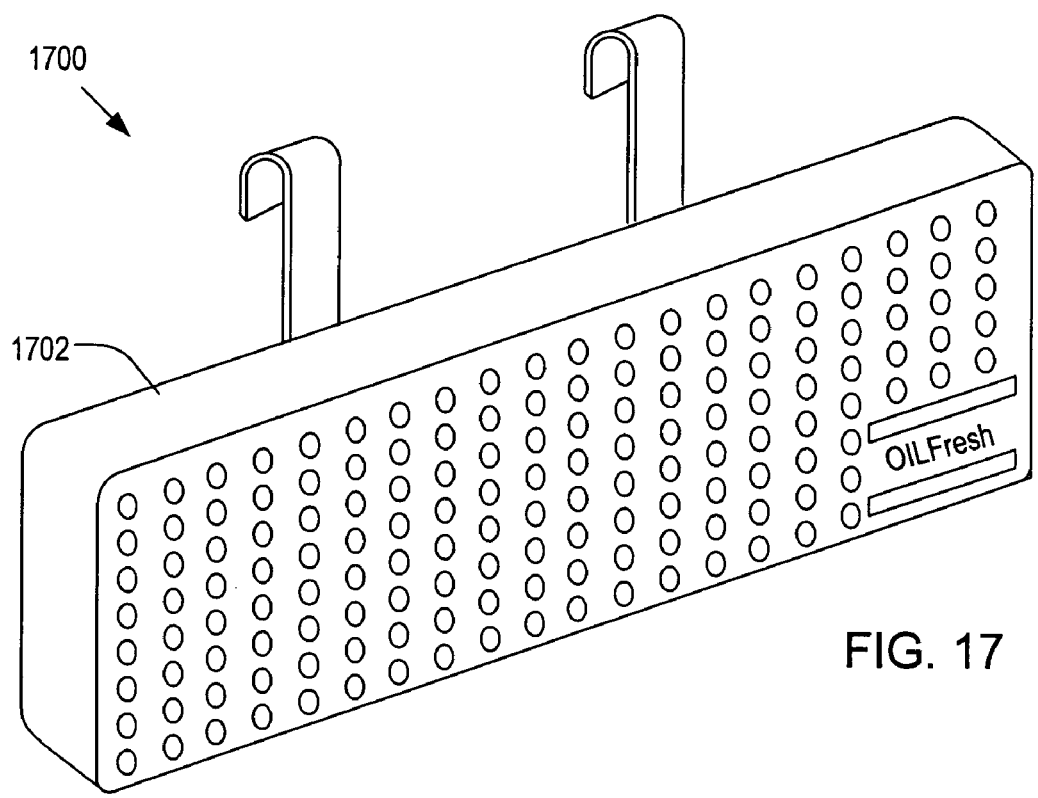
FIG. 17 is a perspective view of another embodiment of a bead trap that may be used in the cooking vessel shown in FIG. 15.

Depending on the size and shape of the space between the basket 1504 and the side wall 1502, other types of bead containers may also be used. FIG. 17 is a perspective view of another embodiment 1700 of a bead trap that may be used in the cooking vessel in FIG. 15. As illustrated, the bead trap 1700 may be similar to the bead trap 1506 in FIG. 16 with the difference that the bead container 1702 may be substantially a rectangular cylinder. In still another embodiment, more than one bead container as illustrated in FIGS. 4-5 may be used in place of the bead container 1702. In yet another embodiment, the bead container 602 shown in FIG. 6 may be used in place of the bead container 1702.

Figure 18A:
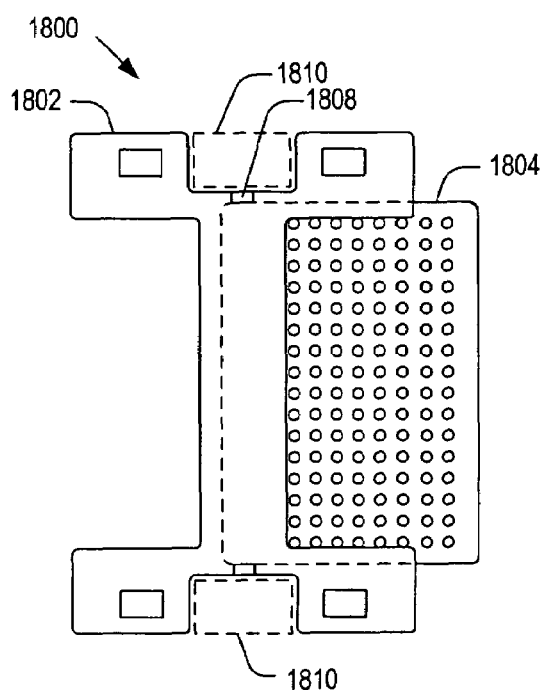
FIG. 18A is a top plan view of a bead trap assembly in accordance with another alternative embodiment of the present invention.
Figure 18B:
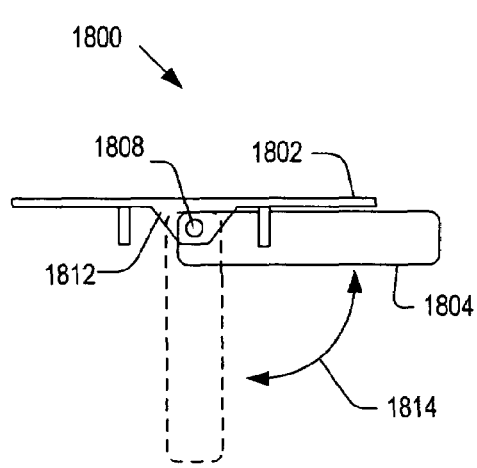
FIG. 18B is a side elevation of the bead trap assembly shown in FIG. 18A.

FIG. 18A is a top plan view of a bead trap assembly 1800 in accordance with another embodiment of the present invention. As illustrated, the bead trap 1800 may include: a mounting adapter 1802; and a bead container 1804 rotatably connected to the mounting adapter 1802 via a pair of hinges 1808. The mounting adapter 1802 may be similar to the mounting adapter 114 (FIG. 3) with some differences. Firstly, the mounting adapter 1802 may not have the two pairs of slots 136a-b (FIG. 3). Secondly, as the mounting adapter 1802 may be made of a sheet metal, two portions 1810 of the mounting adapter 1802 may be cut and folded downward to provide a pair of apertured hinge plates or tabs 1812 that are rotatably engaged by the pair of hinge pins or shafts 1808. The bead container 1804 may be flipped down during operation, as indicated by an arrow 1814 in FIG. 18B which is a side elevation of the bead trap assembly 1800, while the bead trap assembly 1800 may be shipped and transported with the bead container 1804 flipped up to reduce the packing space. It is noted that a portion of the bead containers including 1804, 1506 and 1702 may be made of mesh as illustrated in connection with FIGS. 11-12.

Figure 19A:
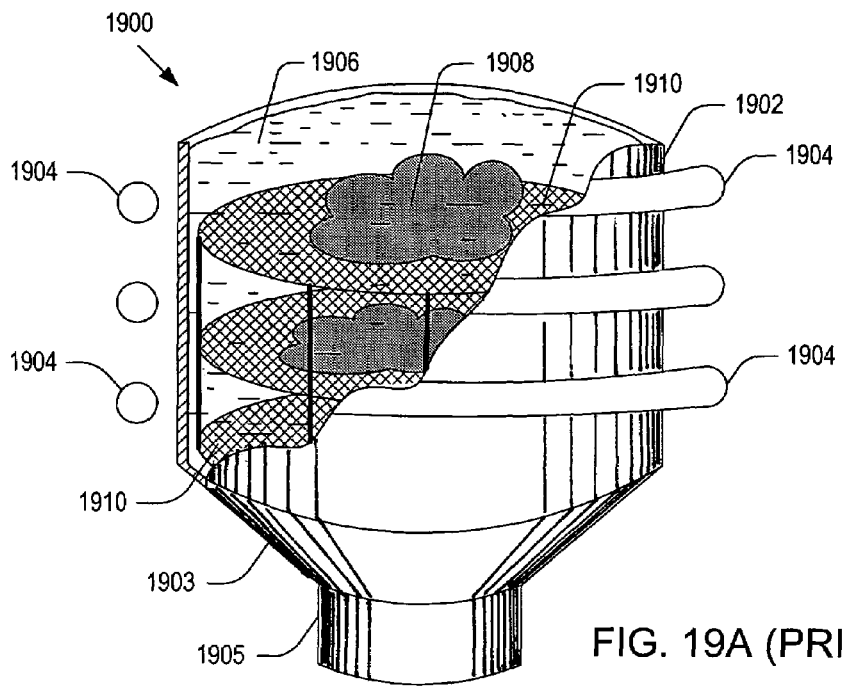
FIG. 19A is a partial cut-away view of a conventional cooking vessel.
Figure 19B:
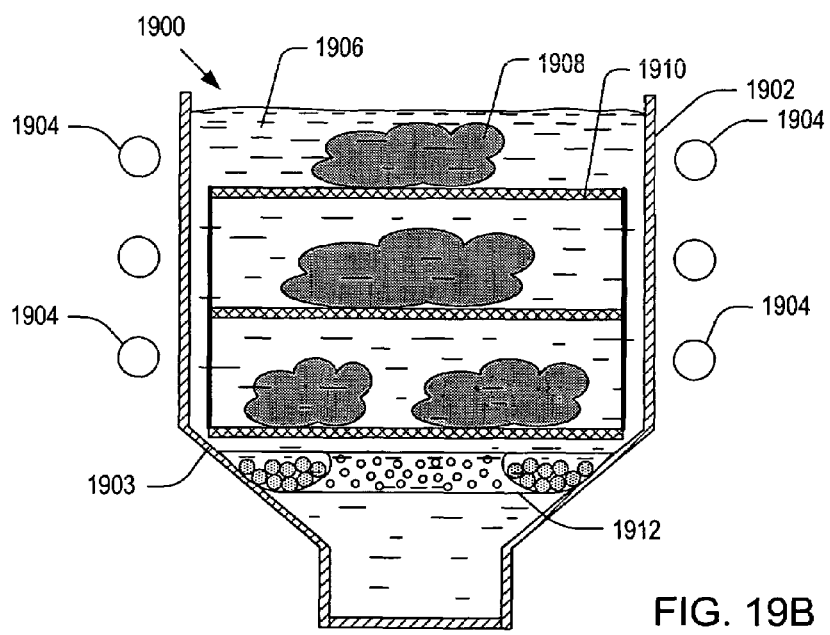
FIG. 19B is a front cross-sectional view of the cooking vessel in FIG. 19A, including a bead container in accordance with the present invention.

FIG. 19A is a partial cut-away view of another type of conventional cooking vessel shown at 1900 and includes: a side wall 1902 for containing frying oil 1906; a plurality of electrical heating coils 1904 wrapped thereabout for heating frying oil 1906 through the side wall 1902; and trays 1910 for supporting food 1908 mounted thereon and preferably made of perforated screen or mesh. A typical example of the cooking vessel 1900 is "The Collectramatic Fryer" disclosed in http://www.winstonind.com/cf.htm. The cooking vessel 1900 may also include: a conical frustum 1903 for supporting the trays 1910 (as illustrated in FIG. 19B); and a bottom section 1905 for collecting food crumbs and draining the frying oil 1906 by means not shown. FIG. 19B is a front cross-sectional view of the cooking vessel 1900 showing use of a generally annular bead container 1912 to reform the frying oil 1906.

Figure 20:
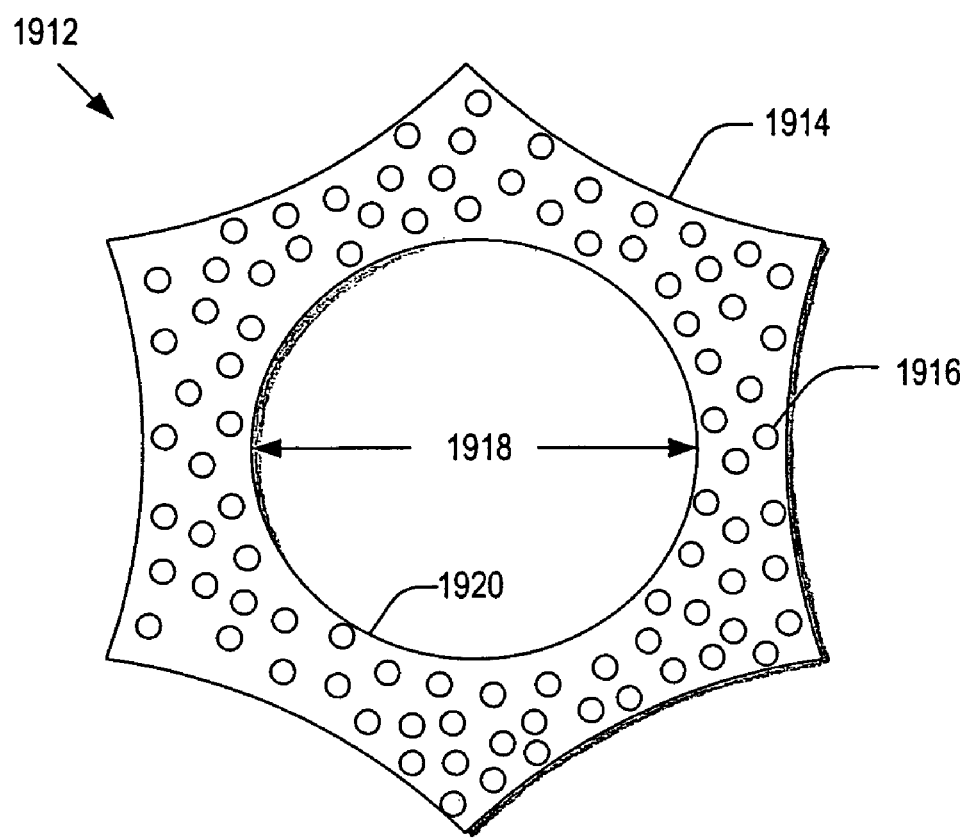
FIG. 20 is a top plan view of the bead container shown in FIG. 19B.

FIG. 20 is a top plan view of one form of the bead container 1912 shown in FIG. 19B. As illustrated in FIG. 20, the bead container 1912 may have a circular inner aperture 1920 and an outer perimeter 1914 that may have a generally polygonal geometry, and preferably a hexagonal shape. Each leg of the polygon forming the outer perimeter 1914 may be slightly bowed toward the center of the polygon so that only the vertices of the outer perimeter 1914 contact the conical frustum 1903 for support resulting enhanced fluid communication around the outer perimeter 1914. The diameter 1918 of the inner aperture 1920 of the bead container 1912 may be larger than that of the bottom section 1905 of the cooking vessel 1900 so that an operator of the cooking vessel 1900 may have an access to the bottom section 1905 without removing the bead trap 1912.

In an alternative embodiment, the beat container 1912 may have perforations 1916 on its bottom side only (or, equivalently, the side facing the bottom section 1905) so that food crumbs migrating from the trays 1910 may not get inside of the bead trap 1912.

It should be understood, of course, that the foregoing relates to exemplary embodiments of the invention and that modifications may be made without departing from the spirit and scope of the invention as set forth in the following claims.

What is claimed is:

1. A device for reforming frying oil contained within a cooking vessel, comprising:
    at least one bead container having a plurality of perforations formed in at least one wall thereof and being submerged in the frying oil during operation of the cooking vessel;
    a plurality of beads contained within said bead container, said beads being adapted to reform the frying oil flowing through said perforations and in contact therewith; and
    a suspending mechanism for supporting said bead container relative to the cooking vessel, said suspending mechanism including:
    a mounting adapter including a plurality of flanges, configured to mount on a supporting portion of the cooking vessel, and having a through hole formed therein; and
    a pair of hook brackets affixed to the bead container and configured to engage into the through hole so that the bead container is suspended from the mounting adapter.

2. The device of claim 1, wherein the supporting portion includes a pair of heating pipes or heating surfaces of the cooking vessel, and wherein said mounting adapter further includes one or more alignment tabs to prevent said flanges from sliding off of the pair of heating pipes and wherein the alignment tabs and the plurality of flanges form an integral body so that the alignement tabs are not movable relative to the plurality of the flanges.

3. A device for reforming frying oil contained within a cooking vessel, comprising:
    at least one bead container having a plurality of perforations formed in at least one wall thereof and being submerged in the frying oil during operation of the cooking vessel;
    a plurality of beads contained within said bead container, said beads being adapted to reform the frying oil flowing through said perforations and in contact therewith; and
    a suspending mechanism for supporting said bead container relative to the cooking vessel, wherein the suspending mechanism includes:
    a mounting adapter, including:
        a plurality of flanges configured to mount on a pair of heating pipes or heating surfaces of the cooking vessel,
        one or more alignment tabs to prevent the flanges from sliding off of the pair of heating pipes, the alignment tabs and the plurality of flanges forming an integral body so that the the alignment tabs are not movable relative to the plurality of flanges, and
    at least one apertured hinge tab; having an aperture formed therein; and
    at least one hinge pin connected to the bead container and engaged into the aperture so that the bead container is rotatably connected to the mounting adapter.

4. The device of claim 1, wherein the suspending mechanism includes a hooking mechanism coupled to the bead container and configured to hangingly grip a grill of the cooking vessel so that the bead container is suspended from the grill.

5. The device of claim 4, wherein the hooking mechanism includes one element selected from the group consisting of a hook, a hook with a spring snap, and a pair of threaded bolt and nut.

6. The device of claim 1, wherein the suspending mechanism includes at least one hanging bracket coupled to the bead container and configured to hook on a wall of the cooking vessel so that the bead container is suspended from the wall.

7. The device of claim 6, wherein the hanging bracket is in the form of an elongated rectangle, one end thereof being curled to form a hook portion.

8. The device of claim 1, wherein a portion of the bead container is made of mesh.

9. The device of claim 1, wherein the bead container is in the form of one element selected from a group consisting of rectangular cylinder, circular cylinder, triangular cylinder, rectangular tube and circular tube.

10. The device of claim 9, wherein the bead container has a tortuous geometry.

11. The device of claim 1, wherein a top portion of the bead container has a convex curvature to cause a food crumb migrating toward the top portion to fall away from the bead container.

12. The device of claim 1, wherein the bead container has one or more food drain slots for draining food crumbs trapped inside thereof.

13. The device of claim 1, wherein the bead container has a removable closure for accessing the beads.

14. The device of claim 1, wherein the bead container has at least one partitioning rack dividing the bead container into a plurality of compartments for containing the beads.

15. In a cooking vessel including a plurality of walls for containing frying oil, means for heating the frying oil, means for supporting food submerged in the frying oil, and oil treatment means, an improved oil treatment means comprising:
    at least one bead container having a plurality of perforations formed in at least one wall thereof and being submerged in the frying oil during operation of the cooking vessel;
    a plurality of beads contained within said bead container, said beads being adapted to reform the frying oil flowing through said perforations and in contact therewith; and
    a suspending mechanism for supporting said bead container relative to the cooking vessel, said suspending mechanism including:
    a mounting adapter, including:
        a plurality of flanges configured to mount on a pair of heating pipes or heating surfaces of the cooking vessel and having a through hole formed therein, and
        one or more alignment tabs to prevent said flanges from sliding off of the pair of heating pipes; and a pair of hook brackets affixed to the bead container and configured to engage into the throuah hole so that the bead trap is suspended from the mounting adapter.

16. The cooking vessel of claim 15, wherein the suspending mechanism includes a hooking mechanism coupled to the bead container and configured to hangingly grip a grill of the cooking vessel so that the bead container is suspended from the grill.

17. The cooking vessel of claim 15, wherein the suspending mechanism includes at least one hanging bracket coupled to the bead container and configured to hook on a wall of the cooking vessel so that the bead container is suspended from the wall.

* * * * *